Jan. 2, 1968   V. O. JOHNSON ET AL   3,361,277
FLEXIBLE TRANSPORT FOR SELF-PROPELLED SWATHERS
Filed Sept. 13, 1965
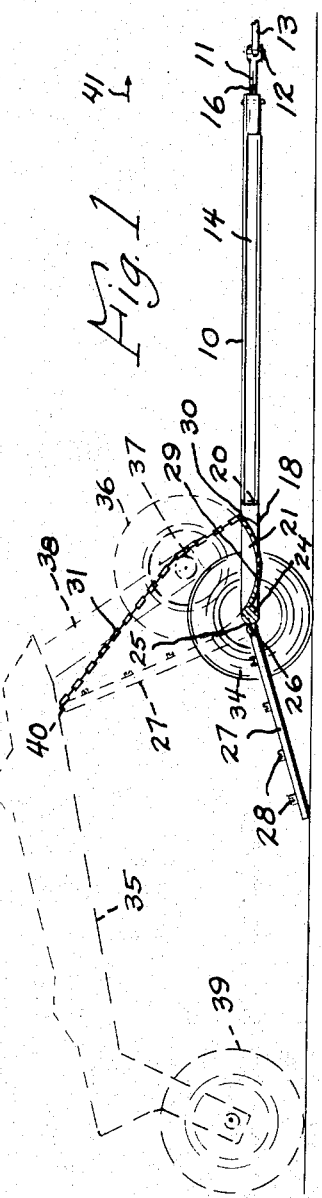
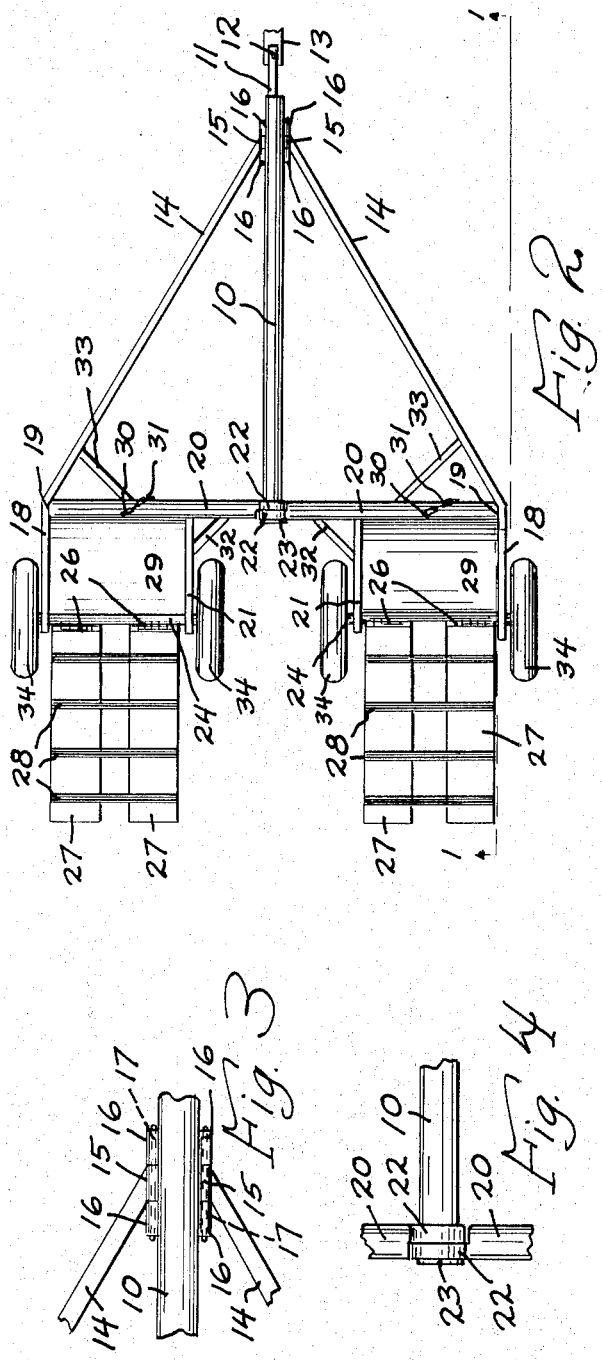
INVENTORS
Verle O. Johnson
Marvin A. Schaeffer
BY
Sam J. Slotsky
ATTORNEY

United States Patent Office 3,361,277
Patented Jan. 2, 1968

3,361,277
FLEXIBLE TRANSPORT FOR SELF-PROPELLED SWATHERS
Verle O. Johnson, Viborg, S. Dak. 57070, and Marvin A. Schaeffer, Menno, S. Dak. 57045
Filed Sept. 13, 1965, Ser. No. 486,966
1 Claim. (Cl. 214—334)

Our invention relates to a flexible transport for self-propelled swathers, or other similar units.

An object of our invention is to provide a transport especially useable in connection with dual tire units.

A further object of our invention is to provide a transport wherein the self-propelled unit can be driven upwardly along certain ramps, and whereby the forward end of the unit is effectively held by means of the ramp, etc.

A further object of our invention is to provide a unit which is flexible laterally to accommodate various contours in the roadway and the like.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

FIGURE 1 is a sectional view of FIGURE 2 taken along the lines 1—1 of FIGURE 2,

FIGURE 2 is a plan view of FIGURE 1,

FIGURE 3 is an enlarged detail of one of the joint connections, and

FIGURE 4 is a further joint connection detail.

Our invention contemplates the provision of a transport unit which can be hitched to any drawing vehicle and wherein wheeled dual tire units such as swathers especially can be readily mounted thereon so that the units can be transported from place to place.

In describing our invention we have used the character 10 to designate a horizontally positioned pipe having the adjustable hitching portion 11 which can be attached as at 12 to a draw bar or other member 13 attached to a tractor, and we have further used the character 14 to indicate a pair of bracing channels to which are attached the sleeves 15, and attached to the member 10 are the further sleeves 16.

Received within the members 15 and 16 are the lengthened pins 17 (see FIGURE 3). Extending integrally from the members 14 are the portions 18 and securely attached at 19 are the transverse further pipes 20 to which are also attached the rearwardly extending supports 21.

Attached to the pipes 20 are the collars 22 which receive the pipe 10, the character 23 indicating an expanded collar attached to the pipe 10. Passing through the members 18 and 21 are the shafts 24, and securely welded to the shafts 24 at 25 are the hinge elements 26 which are secured to the various ramps 27, and attached across the ramps 27 are the spaced channel members 28.

Attached to the shafts 24 and the pipes 20 are the pair of arcuate dished members 29, and attached as at 30 to the pipes 20 are the lengthened chains 31. The characters 32 and 33 indicate further bracing members. The character 34 designates wheels journalled at the ends of the shafts 24.

The arrangement is operated in the following manner.

The character 35 indicates the framework of a swather having two pairs of forward wheels 36 or the usual dual tire arrangement, these wheels being suitably journalled on the axle in the housing 37 mounted in the further framework portion 38, and the character 39 indicates a trailing rear wheel.

The ramps will be in the position shown by the solid lines in FIGURE 1, and the self-propelled unit comprising the framework 35, 38, etc. is driven so that the forward wheels 36 will travel upwardly along the inclined ramps 27, the transverse members 28 providing a firm grip on the wheels, and the wheels are driven upwardly until they will then fall into the arcuate members 29. The lengthened chains 31 are then placed over the housings 37 and are attached as at 40 to the ends of the ramps 27, after the ramps are pivoted on the hinges 26 to the dotted position shown whereby portions of the ramps will be securely held against the wheels 36. The tractor or other towing device can then be driven in the direction of the arrow 41 whereby the unit will be securely held during the traveling action.

It will be also specifically noted that the hinged connections at 15, 16, and at 22 will permit the framework portions at either side of the tube 10 to rise and fall freely so that the unit can be transported in a completely flexible manner regardless of the contour of the roadway or the like so that the weight of the unit will be evenly distributed at all times and with other advantages. After the unit is transported it can then be backed up in the reverse manner and travel down the inclined ramps 27.

It will now be noted that we have provided a variety of advantages as mentioned in the objects of our invention, and with further advantages which are apparent.

Some changes may be made in the construction and arrangement of the parts of our invention without departing from the real spirit and purpose of our invention, and it is our intention to cover by our claim any modified forms of structure or use of mechanical equivalents which may be reasonably included within their scope.

We claim as our invention:

1. A transport unit comprising a framework means for attaching a towing vehicle to said framework, said framework having a pair of substantially arcuate dished members attached thereto for receiving the forward wheels of a vehicle to be towed, a plurality of ramps and hinged adjacently to said dished members, means for locking said towed vehicle into said dished members, including chains attached to said framework, said chains being adapted to pass over the axle portions of said towed vehicle wheels and adapted to be attached to said ramps when said ramps are in raised position, said framework including an elongated substantially horizontally positioned tube, said framework including side portions hinged to said tube, said dished members comprising a pair of the same, each of which is adapted to receive a dual wheel construction, there being a pair of said ramps to accommodate each of said dished members, transverse channels attached across said ramps, rearwardly extending supports, shafts mounted in said supports, said ramps being hinged to said shafts, wheels journalled on said shafts.

References Cited

UNITED STATES PATENTS

| | | | |
|---|---|---|---|
| 2,391,503 | 12/1945 | Page | 280—506 |
| 2,776,063 | 1/1959 | Larson | 214—334 |
| 3,147,871 | 9/1964 | Sogus | 214—85 X |

HUGO O. SCHULZ, *Primary Examiner.*